March 23, 1943.　　　O. H. SHENSTONE　　　2,314,664
TRANSMISSION MECHANISM
Filed Nov. 2, 1939　　　2 Sheets-Sheet 1

INVENTOR
OSBORNE H. SHENSTONE
BY A. S. Krotz
ATTORNEY

March 23, 1943.  O. H. SHENSTONE  2,314,664
TRANSMISSION MECHANISM
Filed Nov. 2, 1939  2 Sheets-Sheet 2
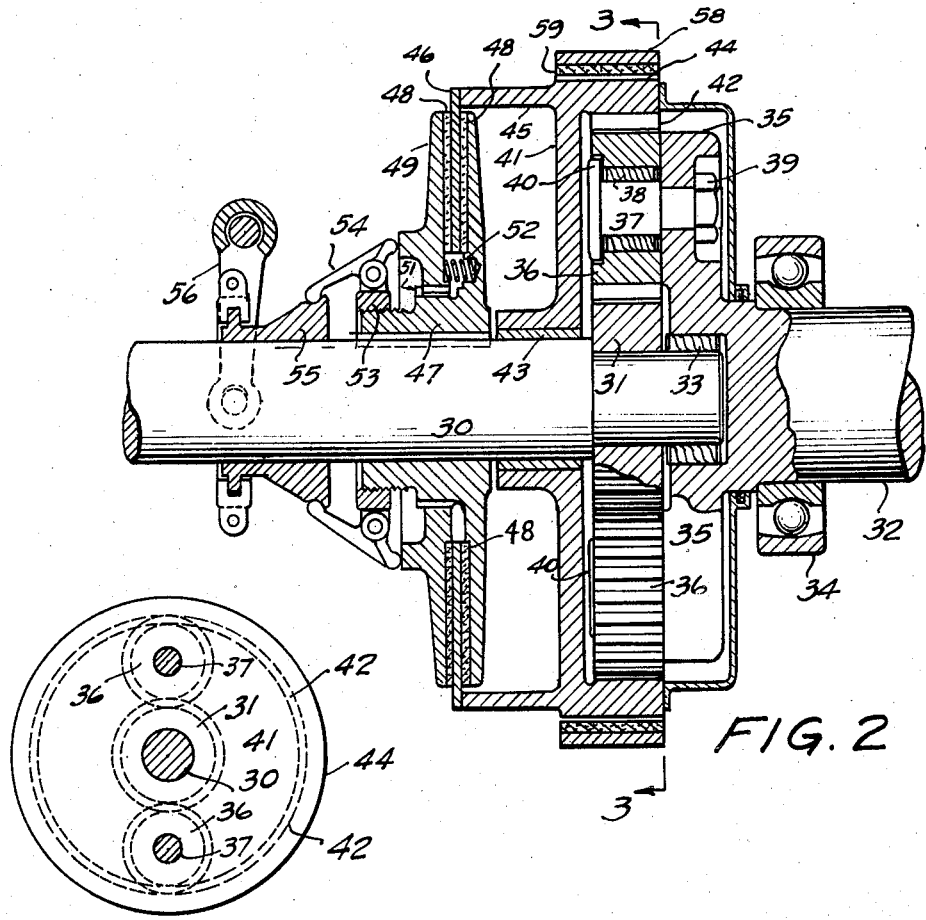
FIG. 2
FIG. 3
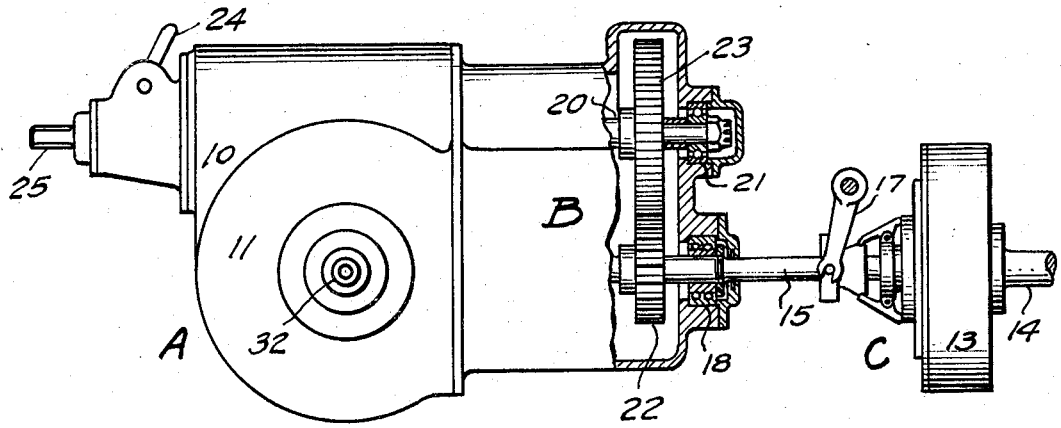
FIG. 4
INVENTOR
OSBORNE H. SHENSTONE
BY W. S. Krotz
ATTORNEY Patented Mar. 23, 1943

2,314,664

UNITED STATES PATENT OFFICE 2,314,664

TRANSMISSION MECHANISM

Osborne H. Shenstone, Toronto, Ontario, Canada, assignor to Massey-Harris Company Ltd., Toronto, Ontario, Canada, a corporation of Canada Application November 2, 1939, Serial No. 302,528

1 Claim. (Cl. 180—17)

The present invention relates to an improvement in tractors and the like comprising secondary speed controlling transmissions which are positioned on opposite sides of the differential permitting the use on a tractor, of a standard automobile or truck differential and transmission.

An object of the present invention is to provide operating transmission connections between the differential and ground wheels which may be caused to operate optionally on a 1 to 1 ratio or a considerably increased ratio between the differential and ground wheels.

Another object of my invention is to provide means whereby the secondary transmission controls may each be engaged simultaneously thereby act as a brake for the tractor or independently in pairs to thereby provide means for assisting the guiding wheels to make short turns and to start and stop the tractor by either secondary transmission means.

Another object of the present invention is to provide means whereby the tractor may be stopped without stopping the power take-off shaft.

I accomplish the foregoing and other objects by the use of epi-cyclic trains of gears which are positioned on opposite sides of the differential and between the differential and ground wheel axles.

To these and other useful ends my invention consists of parts, combinations of parts, or their equivalents and mode of operation, as hereinafter set forth and claimed and shown in the accompanying drawings in which:

Fig. 2 is an enlarged fractional vertical section of one of the secondary transmissions.

Fig. 3 is a transverse section taken on line 3—3 of Figure 2, minus the braking band.

Fig. 4 is a side view of the rear axle housing and the transmission with the ground wheels removed. A fraction of the transmission housing is cutaway to illustrate the power take-off shaft operating connection to the transmission shaft.

Figures 1, 5:
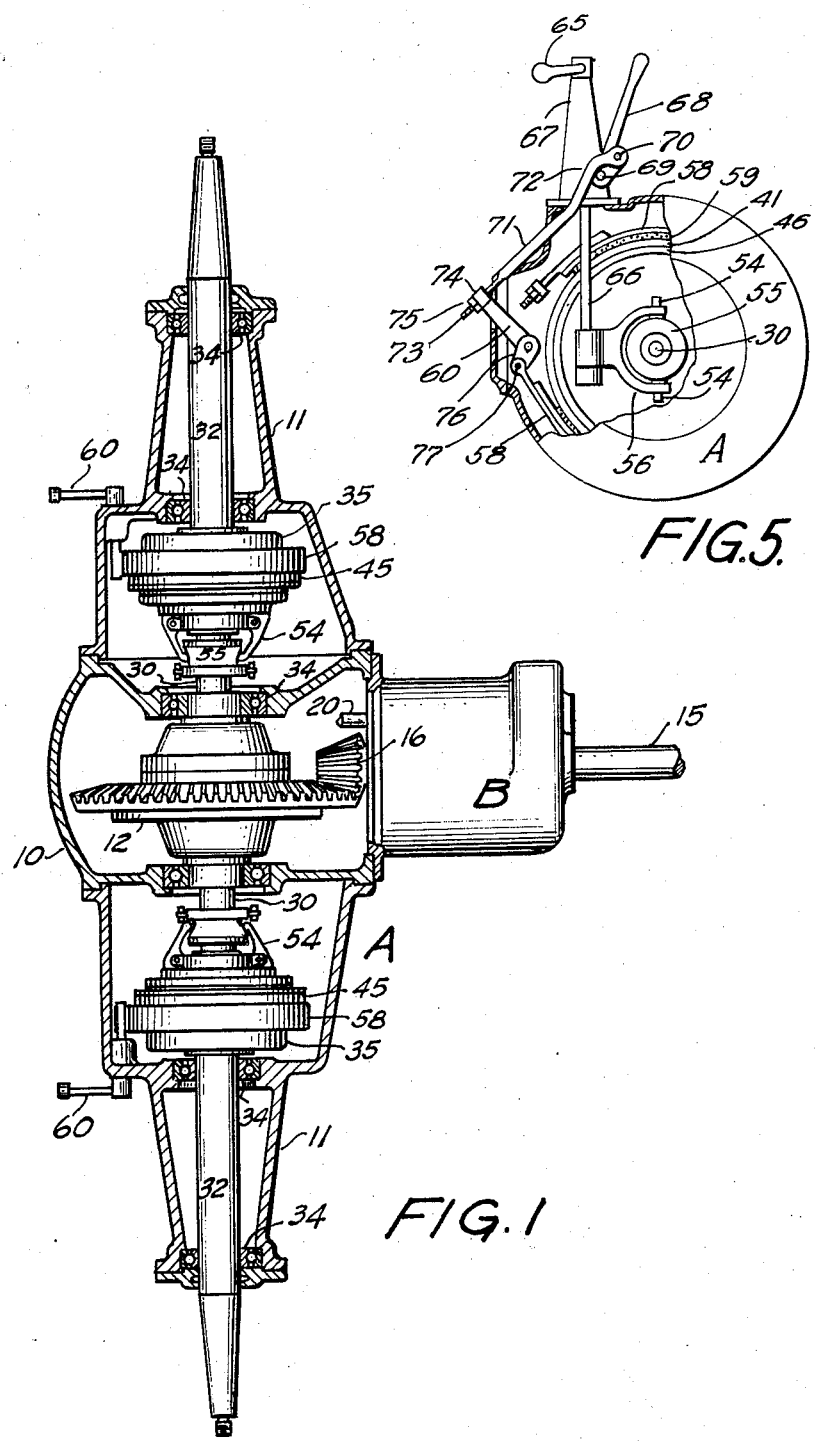
Fig. 1 is a horizontal section of the preferred form of my invention.
Fig. 5 is a diagrammatic drawing illustrating the hand controlling connections to the supplemental transmissions.

As thus illustrated, the rear axle is, in its entirety, designated by reference character A. The primary transmission is optional and, for all practical purposes may be considered conventional except that it is mounted preferably on the rear axle housing instead of on the engine which is, in its entirety, designated by reference character B.

The forward clutch mechanism including the engine fly wheel in its entirety is designated by reference character C.

I provide a rear axle housing comprising three parts, namely a differential housing 10 and outwardly projecting axle and secondary transmission housings 11—11.

I rotatably mount a differential 12 in housing 10 in the usual manner. Member B is provided with two or more forward speeds, a reverse and a conventional gear shifting lever (not shown). The engine of the tractor is provided with a fly-wheel 13 which is secured to the engine crank shaft 14 in the usual manner.

A shaft 15 is operatively connected to fly wheel 13 by means of a conventional clutch the operating lever of which is indicated by numeral 17. Shaft 15 is operatively connected to a conventional transmission which, in turn, is adapted to drive pinion 16 the pinion being adapted to engage the gear teeth of differential 12. Shaft 15 is rotatably mounted in transmission housing B in the usual manner one of the bearings being shown as at 18.

I rotatably mount a power take-off shaft 20 in suitable extensions formed on members 10 and B one of the bearings of which is shown as at 21. In preferably the forward end of the housing of transmission B I mount on shaft 15 a pinion 22. A gear 23 is secured to shaft 20 which operatively engages pinion 22.

It will be seen that when clutch C is engaged, shaft 20 will be operated even though the transmission is in neutral and insofar as the tractor is concerned, the engine, transmission, clutch and differential will operate exactly like an automobile or truck and the size of these parts need not be larger than used on automobiles or trucks having similarly powered engines for reasons which will hereinafter appear.

I provide a stub shaft 25 for connection to the implement propeller shaft which may be operatively connected to the power take-off shaft 20 by means of a clutch controlling lever 24; thus, if desired, shaft 25 need not be operated except when needed. Shaft 20, however, will be operated at all times when the clutch of unit C is engaged.

I provide epi-cyclic trains of gears one on each side of the differential which form the operating connections between the differential and the ground wheel axles. The epi-cyclic gears or what I term supplemental transmissions may be operated optionally to drive the ground wheel axles at the same speed as the speed of the differential for fast road work or to operate the ground wheel axles at a considerable less speed than the speed of the differential for field work.

Referring now specifically to Figures 1, 2 and 3, the differential is provided with two stub shafts 30—30 on the outer ends of which are secured pinions 31—31, the protruding ends of the shafts being rotatably mounted in the inner end of the rear ground wheel axles 32—32 preferably by means of roller bearings 33, the axles 32 being carried by ball or roller bearings 34. The inner ends of shafts 32 are supplied with spiders 35 upon which I rotatably mount two or more pinions 36 by means of studs 37 and roller bearings 38 the studs being securely fastened to the spider by means of nuts 39. The studs are provided with heads 40 which act to hold the pinions into position.

I provide internal gears 41 having teeth 42 which operatively engage the teeth on pinions 36. Gears 41 are rotatably mounted on shafts 30 by means of bushings 43 and are provided with an outer surface 44 which is trued and made suitable for contact with the braking bands as will hereinafter appear.

Members 41 are provided with annular flanges 45 which are adapted to carry clutch plates 46. I provide preferably a conventional clutch the main unit 47 of which is slidably splined or keyed to shaft 30 and having mounted on its front face the usual fabric disc 48.

The front plate 49 of the clutch is also provided with a fabric disc 48 and is slidably keyed to member 47 as at 51. I provide a number of spaced springs 52 which act to automatically disengage the clutch. Clutch adjusting rings 53 are screw threaded on members 47 and are adapted to carry a number of clutch dogs 54 which are adapted to engage the clutch when the free ends of the dogs are forced outwardly by means of a cone shaped collar 55.

In Figure 2 I illustrate the clutch as being engaged by means of the usual forked arm 56. To disengage the clutch, the free ends of the forks are moved toward the clutch to permit the rear end of dogs 54 to move toward shaft 30.

I have illustrated a conventional automobile or truck clutch in Figure 2. It will be understood that I may elect to use other designs of engageing means between shafts 30 and members 41.

In Figures 1 and 2 I illustrate braking bands 58 having fabric strips 59 and operating connections to levers 60. These levers 60 may be operated to cause band 59 to grip and hold member 41 from turning at which time motion will be transmitted from pinion 31 to spider 35 through pinions 36 at a ratio of say 3 to 1 or thereabout.

When the clutch is engaged, clearly gear 41 will turn at the same speed as pinion 31 at which time pinions 36 will be carried around with these parts and axle 32 will be turned at the same speed as shafts 30. One only of the clutches or braking bands may be engaged so as to assist the tractor in making short turns.

Clearly, if the clutches and brake bands 58 are operated simultaneously, they will act as brakes for the tractor.

Obviously by manipulating the clutches and brake bands, the operator can assist or actually turn the tractor one way or the other; for example, if the clutch only on one side is engaged and only the brake band on the other side is engaged, then the brake band side of the tractor will tend to travel slower than the other side. If the clutch and brake bands are each engaged on one side of the tractor and the brake band only is engaged on the other side of the tractor, then the engaged clutch side of the tractor will tend to stand still and the other side travel forwardly, thus to make a short turn; therefore the clutches and brake bands may act as brakes for one or both sides of the tractor.

In straight ahead work, obviously both clutches may be engaged simultaneously for high speed and for low speed straight ahead work, the brake bands may be engaged simultaneously. It will be seen that if one has difficulty in turning the tractor, the guiding wheels may be assisted by manipulating a clutch or a brake band. On the other hand, my device is applicable to tractors of the endless tread type which are not equipped with guiding wheels. By manipulating either the clutches or brake bands, the turning action may be determined as next above described.

In Figure 5 I illustrate one way for manually controlling the brakes and clutches wherein a pair of levers are provided on opposite sides of member 10 and mounted on members A within easy reach of the operator, portions of member A being removed so as to fully illustrate the mechanism. The clutch member is controlled by a lever 65 having a connection to a shaft 66 on the lower end of which fork 56 is secured. By moving the end of lever 65 forwardly or rearwardly, the clutch may be engaged or disengaged. The upper end of shaft 66 is rotatably mounted in a post 67, the post being secured to member A of the housing as illustrated.

I provide a bracket on member A to which a lever 68 is pivoted as at 69, the lever having a pin 70 forming a connection to an arm 71, the arm being curved at its forward end as at 72 and having a rear bolt end 73 which passes through a block 74, the block being pivoted to the upper end of lever 60. A nut 75 is screw threaded on bolt 73 and will act as an adjustment whereby when lever 68 is pushed forwardly, arm 71 will extend to or below the plane of members 69 and 74 thus to lock the brake band into engaged position.

Lever 60 is provided with a link 76 having a pivotal connection to the lower end of band 58 as at 77. It will be seen that band 58 may be tightened or loosened by pushing lever 68 forwardly or pulling it rearwardly.

The parts shown are duplicated on the left side of member 10. Clearly the clutch and brake on the left side are controlled by the left hand of the operator. At least there are four levers, two on the left side and two on the right side of housing 10, the levers being within easy reach of the operator so he is able to engage or disengage the brake bands and clutches at will and as herebefore described.

Clearly the operator may control the tractor by means of the conventional clutch and transmission and means are provided whereby additional speed and guiding means are available.

Clearly, I have provided convenient means for operating the tractor at high speed and a suitable reduction in the same mechanism for operating the tractor at low speed independent of the regular transmission and that the same mechanism may be used as a tractor brake or as a turning means.

In cooperation with the regular transmission device of a tractor, I have provided a low speed ratio and means for entirely disconnecting the ground wheel axles from the differential so the tractor may be stopped while the power take-off is in operation. Furthermore, the operator may throw in the high speed on one side and the low speed on the other for urging the tractor to turn on a medium radius, for example, when the soil conditions prevent the guiding wheels from acting.

Clearly many minor detail changes may be made without departing from the spirit and scope of the present invention as recited in the appended claim; for example, I may elect to dispense with transmission B and clutch C for small tractors.

Having thus shown and described my invention, I claim:

A tractor of the class described, comprising a rear axle housing having a differential and stub shafts operatively connected to opposite sides thereof, axles rotatably mounted in said housing in axial alignment with said stub shafts, transmissions forming operating connections between said stub shafts and axles, said transmissions comprising pinions mounted near the outer ends of said stub shafts, hubs secured to the inner ends of said axles each having a number of spaced pinions rotatably mounted thereon and adapted to operatively engage said first pinions, internal gear members adapted to operatively engage the outer edges of said hub pinions and being rotatably mounted on said stub shafts adjacent said first pinions, clutch members keyed to said stub shafts and adapted to engage said internal gear members, braking means mounted on the rear axle housing adapted to engage said internal gear members, means for manually engaging said clutches and braking means individually, in optional pairs, or in optional combinations, the outer ends of said stub shafts being rotatably mounted in said hubs.

OSBORNE H. SHENSTONE.